United States Patent [19]
Goldberg et al.

[11] 3,765,033
[45] Oct. 16, 1973

[54] PROSTHETIC KNEE JOINT ASSEMBLY WITH MUTUALLY SLIDABLE AND ROLLABLE JOINT SECTIONS

[76] Inventors: Donald D. Goldberg, 184-52 Tudor Rd., Jamaica, N.Y. 11432; Stanley R. Rosen, Geraldine Pl., Spring Valley, N.Y. 10977

[22] Filed: Jan. 19, 1971

[21] Appl. No.: 107,627

[52] U.S. Cl. .................................. 3/1, 3/22, 3/27, 128/92 C
[51] Int. Cl. .......... A61f 1/24, A61f 1/04, A61f 1/08
[58] Field of Search ....................... 3/27, 22, 26, 2, 3/1; 128/92 C, 92 R

[56] References Cited
UNITED STATES PATENTS

| | | | |
|---|---|---|---|
| 3,506,982 | 4/1970 | Steffee | 3/1 |
| 3,694,821 | 10/1972 | Moritz | 128/92 C X |
| 2,400,032 | 5/1946 | Talbot | 3/27 |
| 2,046,069 | 6/1936 | Greissinger | 3/29 |
| 3,638,243 | 2/1972 | Campbell et al. | 3/1 |

FOREIGN PATENTS OR APPLICATIONS

| | | | |
|---|---|---|---|
| 1,122,634 | 5/1956 | France | 128/92 C |
| 163,476 | 6/1958 | Sweden | 128/92 C |
| 48,833 | 12/1953 | Italy | 3/27 |
| 1,047,640 | 7/1953 | France | 128/92 C |

*Primary Examiner*—Richard A. Gaudet
*Assistant Examiner*—Ronald L. Frinks
*Attorney*—Jacob B. Burke

[57] ABSTRACT

An implantable prosthetic knee joint assembly has mutually rollable and slidable upper and lower joint sections. A single retainer pin in an oversize bore or a link and two retainer pins in oversize bores assist muscles and tissues to prevent separation of the joint sections after implantation in a leg. The retainer pins are not weight bearing during leg extension and leg flexure. One joint section has a resilient shock absorbing plastic bearing member. The bearing member of the other joint section may be made of metal. Both bearing members have contacting, smooth, substantially frictionless bearing surfaces. Sufficient free play is provided by the mountings of the retainer pins in oversize bores to permit the weight bearing members to contact each other rollably and slidably when the leg flexes and when it is extended. The joint sections have outwardly extending shanks adapted for securement in the thigh and calf of a person's leg. The bearing members are shaped so that articulation of the joint sections closely simulates human knee joint action.

8 Claims, 22 Drawing Figures

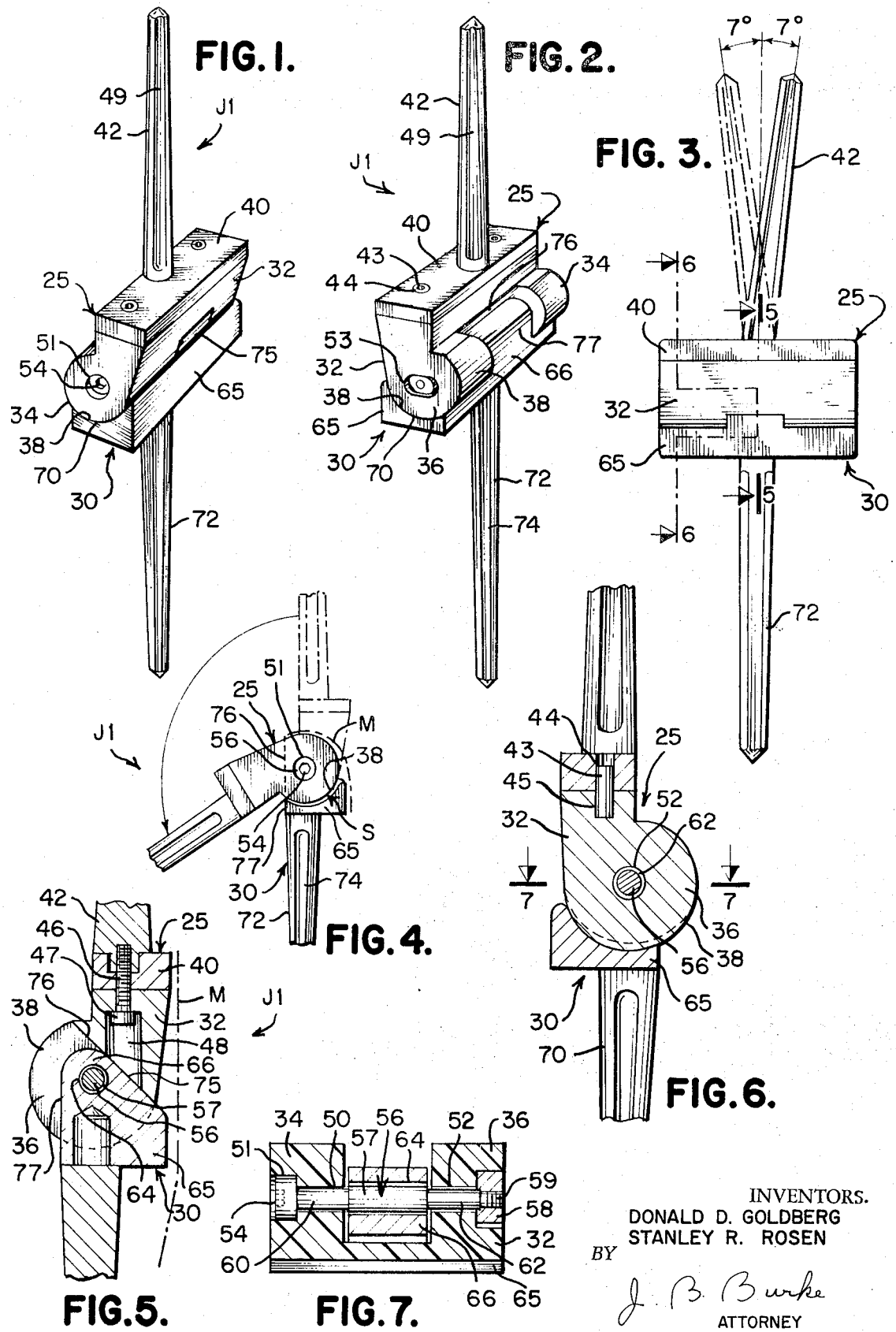

Patented Oct. 16, 1973
3,765,033
4 Sheets-Sheet 2
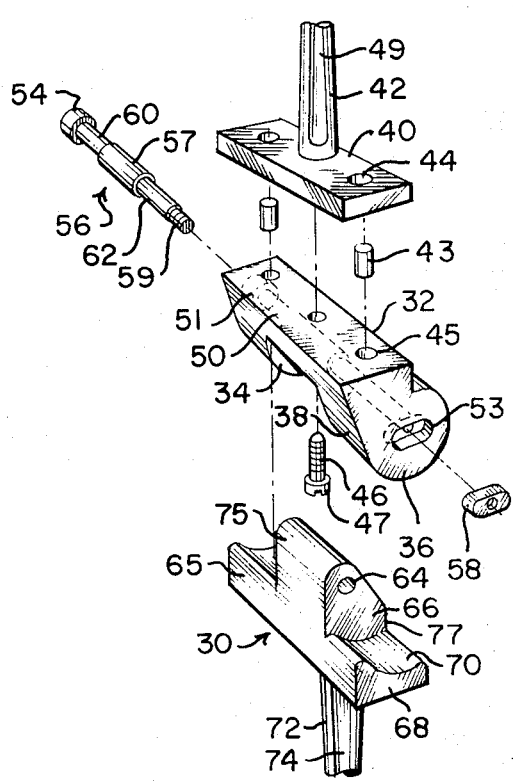
FIG. 8.
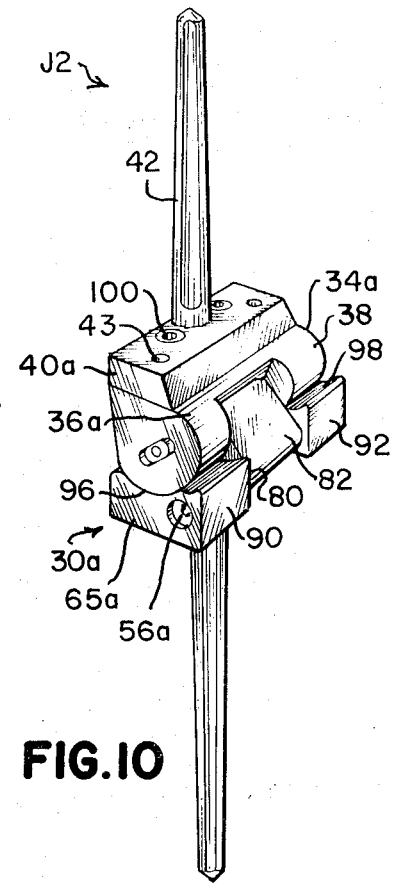
FIG. 10.
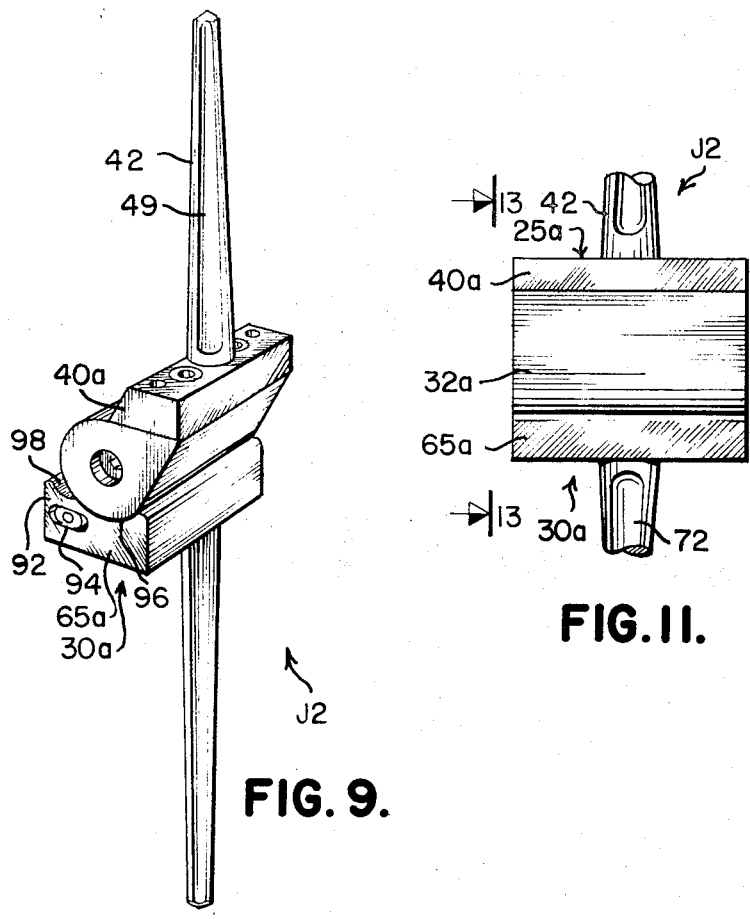
FIG. 9.
FIG. 11.
FIG. 12.
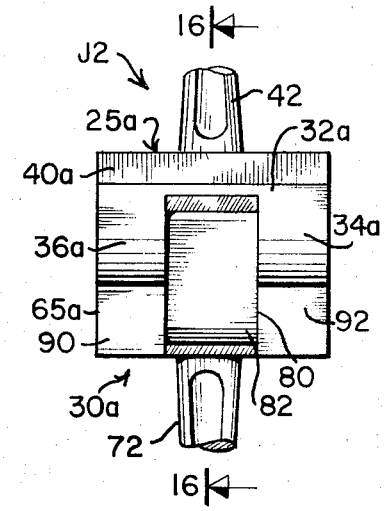
INVENTORS.
DONALD D. GOLDBERG
STANLEY R. ROSEN
BY
J. B. Burke
ATTORNEY

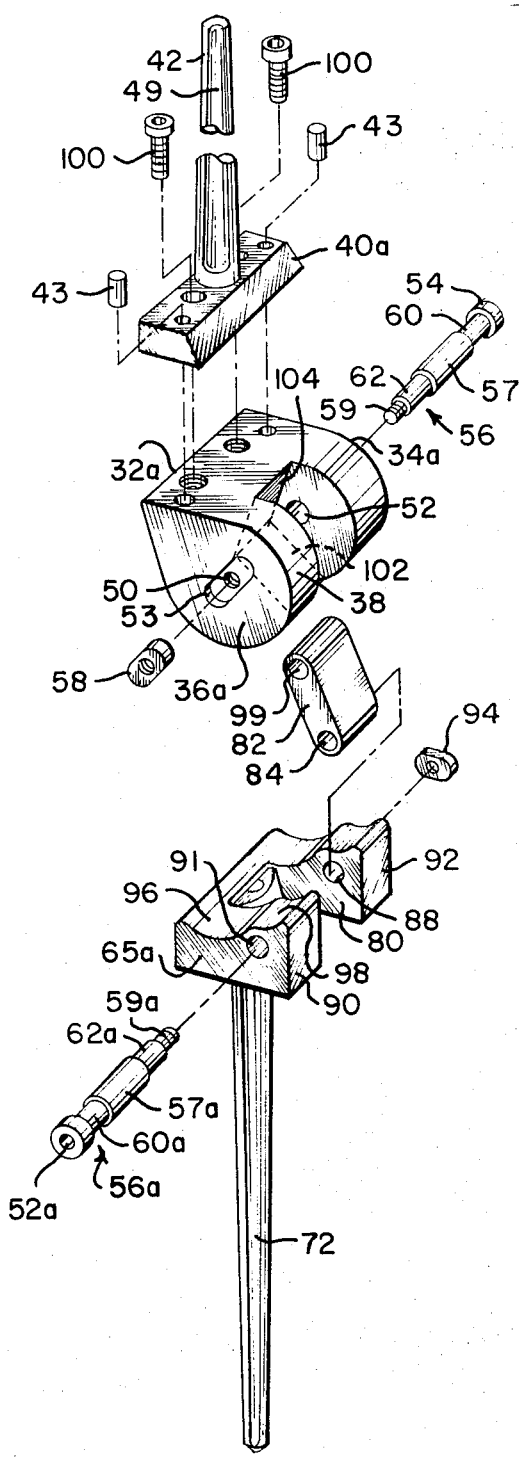
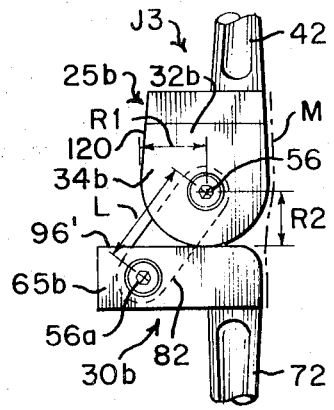
FIG. 20.
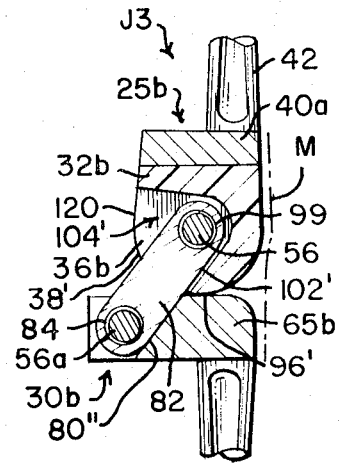
FIG. 19.
FIG. 21.
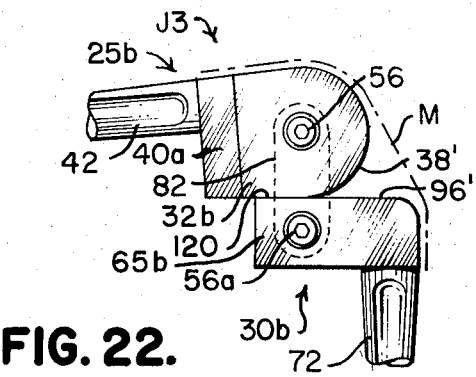
FIG. 22.
INVENTORS.
DONALD D. GOLDBERG
STANLEY R. ROSEN
BY
*J. B. Burke*
ATTORNEY

PROSTHETIC KNEE JOINT ASSEMBLY WITH MUTUALLY SLIDABLE AND ROLLABLE JOINT SECTIONS

This invention concerns improved prosthetic knee joint assemblies primarily intended to replace damaged human knee joints but also adaptable for installation in artificial legs.

Heretofore, prosthetic knee joints have been made of heavy metal parts having two sections rotating on a fixed hinge pin. This hinge pin serves as a weight bearing axle during mutual rotation of the two joint sections. The hinge pin constrains the sections to rotate circularly around the pin. Such circular rotation does not conform to normal, natural knee flexing, which results in uncomfortable, stilted, hesitant walking movements. When such a joint is flexed to its limits of straightening and bending (0° and 90°), the metal-to-metal impact causes mechanical shocks which are painful to the person carrying the prosthetic joint. Furthermore the sounds of metal-to-metal impact are disturbing and embarassing. To avoid such unpleasant shocks and noises the person tends to limit unduly the permissible range of motion of the knee joint. This again results in stilted, awkward walking movements, curtailment of normal leg movements and reduced bodily activities. Also objectionable is the tendency of such repeated metal-to-metal impacts to cause loosening of the prosthetic anchoring shanks and posts in the leg bones. The all metal prior prosthetic knee joints also caused discomfort and fatigue to persons carrying them, due to their massive structure and heavy weight. Further difficulties arose from the fact that all weight was concentrated on the hinge pins. This further increased discomfort and fatigue. Still further difficulties arose from the fact that there was no way of lubricating the metal bearing parts. This caused premature wear, generated heat and friction, and strained the leg muscles with extra work to force flexing of the joints. Some prior prosthetic joints have a maximum range of 90° of flexing which is very limited to start with and is further reduced by the person's limitation of flexing to avoid shock impact as above mentioned. Still other prior prosthetic joints displaced the normal and natural position of the leg bones while bending. This caused uncomfortable, stilted, unnatural, hesitant walking movements.

The present invention is directed at overcoming the above and other difficulties and disadvantages of prior prosthetic knee joints. According to the invention, a new prosthetic knee joint assembly can be constructed in such a way that the leg bones move in a natural, comfortable way while the knee is bending. The bones are not unnaturally displaced while the joint is flexing. The new joint assembly is reduced materially in weight as compared with an all metal joint, by provision of a plastic bearing member. The plastic member has a smooth, slippery, self lubricating surface which slides noiselessly and freely over adjacent metal parts. The plastic bearing member contacts adjacent metal parts almost shocklessly and noiselessly when the knee is straightened and when it is fully flexed, due to the inherent resiliency of the plastic material. The tendency to loss of bond between anchoring parts of the prosthesis and leg bones due to metal-to-metal impacts heretofore encountered, is substantially eliminated.

According to the invention, bending of the joint is accomplished by rotating the upper ball joint section on a platform or track simulating the construction of human knee condyles. The joint sections are engaged by a retainer pin or pins set in an oversize bore or bores in bearing members and links. These pins serve only as retainer members to prevent separation of joint sections and are not load bearing when the leg bones are weighted or loaded. Clearance is provided between the pins and their retaining holes or bores so that outer surfaces of the plastic ball joint parts roll or slide in contact with lower bearing parts. This is a plastic-to-metal contact. It is stable, noiseless, and substantially frictionless. Contact is maintained continuously between the plastic and metal parts at all times when the joint is weight or load bearing both when flexing and when stationary in flexed or straightened position. At other times when the joint is not weight bearing the bearing parts are slightly separated and held in place by muscles and tissues and bones in the thigh and calf of the leg assisted by the retaining pin. This contrasts with prior prosthetic joints where hinge or pivot pins serve as load bearing axles at all times. If these axles were postoperatively removed, the joints could not flex or operate. By the present arrangement, the thigh and calf to which the knee joint sections are respectively attached each turn on a radius several times larger than is possible with conventional prosthetic knee joints rotating on hinge pins which are weight bearing axles at all times. The arrangement of the present invention more closely simulates the structure and actual operation of human knee joints. Due to the larger rotational radius, the bearing area under load is increased and pressure at each bearing point is consequently reduced. As a result, the parts roll and slide easier and more comfortably. Wear of bearing parts is substantially eliminated. The new construction makes it possible to provide an extended range of flexing up to 150° which is more than 50 percent greater than has heretofore been obtainable in prior knee joints. In addition there is eliminated the prior tendency of patients to limit the range of knee flexing, by eliminating the shocks received from prior metal-to-metal knee joint impacts.

The invention further provides means for providing a range and character of motion of leg components adapted to the condition of their leg muscles. Younger persons having more resilient leg muscles can be provided with prosthetic knee joints having a greater range of motion than is provided older persons having less resilient muscles. The new prosthetic joints are provided with shanks or posts shaped so that bone growth will tend to secure them from relative motion in their anchoring leg bones. The shanks or posts can be secured in place in the femur and tibia by suitable surgical cement.

Other and further features, objects and advantages of the invention will become apparent from the following detailed description taken together with the drawings, wherein:

FIG. 1 is a perspective view showing top, front and one side of a prosthetic knee joint assembly embodying the invention, with parts in unflexed open position.

FIG. 2 is a perspective view of the joint assembly similar to FIG. 1, but showing the top, rear and opposite side of the assembly.

FIG. 3 is a front elevational view of the unflexed joint assembly.

FIG. 4 is an enlarged fragmentary side view of the joint assembly in flexed position.

FIG. 5 is an enlarged fragmentary vertical sectional view taken on lines 5—5 of FIG. 3.

FIG. 6 is another enlarged fragmentary vertical sectional view taken on line 6—6 of FIG. 3.

FIG. 7 is a horizontal cross sectional view taken on line 7—7 of FIG. 6.

FIG. 8 is an exploded perspective view of parts of the prosthetic knee joint of FIGS. 1–7.

FIG. 9 is a perspective view similar to FIG. 1 showing top, front and one side of a second prosthetic knee joint in unflexed position.

FIG. 10 is a perspective view similar to FIG. 2 showing top, rear and opposite side of the second knee joint assembly of FIG. 9.

FIG. 11 is a fragmentary enlarged front elevational view of the second knee joint assembly.

FIG. 12 is a fragmentary enlarged rear elevational view of the second knee joint assembly.

FIG. 19 is an exploded perspective view of parts of the second knee joint assembly shown in FIGS. 9–18.

FIG. 20 is a fragmentary side elevational view similar to FIG. 13 showing a third prosthetic knee joint assembly embodying the invention, in unflexed open position.

FIG. 21 is a vertical sectional view of the third knee joint assembly in unflexed open position.

FIG. 22 is a side elevational view similar to FIG. 20 but showing the third knee joint assembly in flexed position.

Figure 13:
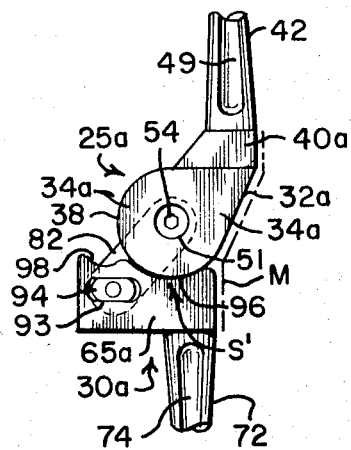
FIG. 13 is a fragmentary side elevational view taken on line 13—13 of FIG. 11.
Figure 14:
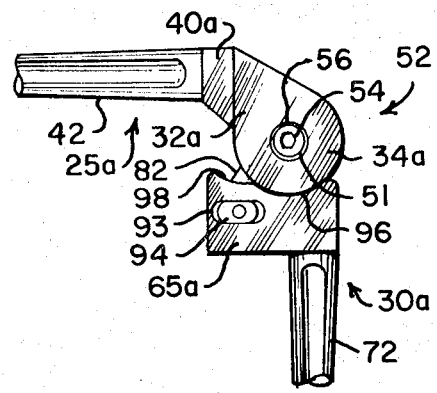
FIG. 14 is a side view similar to FIG. 13 showing the joint assembly in partially flexed position.
Figure 15:
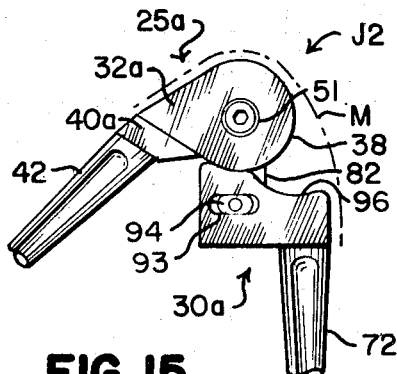
FIG. 15 is a view similar to FIG. 14 showing the joint assembly in fully flexed position.
Figure 16:
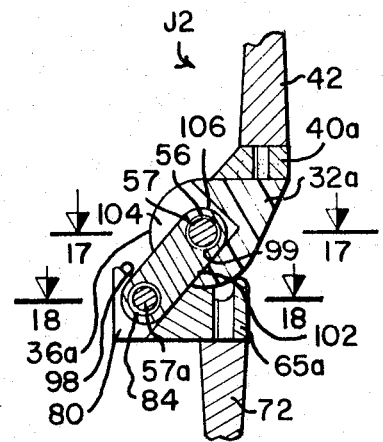
FIG. 16 is a reduced vertical sectional view taken on line 16—16 of FIG. 12.
Figure 17:
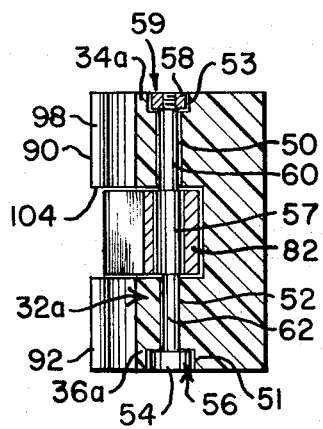
FIG. 17 and FIG. 18 are horizontal sectional views taken on lines 17—17 and 18—18 respectively of FIG. 16.
Figure 18:
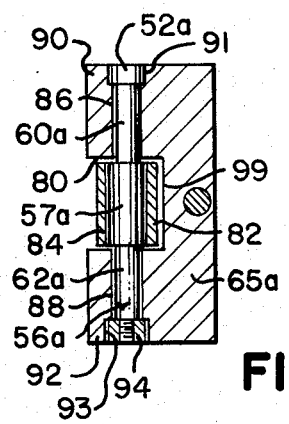

Referring first to FIGS. 1–8, there is shown a prosthetic knee joint assembly J1 having an upper condylar section 25 and a lower condylar section 30. The upper section comprises a bearing member 32 made of strong, dimensionally and chemically stable plastic material. The bearing member has two laterally spaced integral cylindrical roller bearing parts 34, 36. External surfaces 38 of these parts are smooth and slippery so that the joint is in effect self lubricated and requires no further lubrication. The bearing member 32 has a flat top on which seats a metal mounting plate 40. The plate carries an upright metal shank or post 42 secured thereto. The shank is adapted for insertion in the femur of a leg in which the joint is to be installed. Plate 40 is held in place by locating pins 43 and a screw 46. The locating pins are inserted in holes 44,45 in plate 40 and the top of bearing member 32. Screw 46 has a head 47 seated in recess 48 in member 32 and its shank is screwed into plate 40 and post 42; see FIG.5. Post 42 is tapered and disposed at an angle of 7° to the right or left of the vertical axis of the assembly as viewed from the front, depending on whether the joint assembly is to be installed in a person's right leg or left leg respectively; see FIG. 3. The shank 42 may be formed with circumferentially spaced longitudinal grooves 49 which receive bone growth to help secure the post in place in the thigh where it is installed. The shank can further be secured in place with a suitable surgical cement to prevent dislocation of the joint assembly with respect to the leg in which it is installed.

Bearing member 32 is further formed with axially aligned bores 50, 52 extending centrally through the cylindrical bearing parts 34, 36. End 51 of bore 50 is enlarged to receive head 54 of a retainer pin 56. The head has a recess for engagement by a suitable wrench. End 53 of bore 52 is enlarged to receive a flattened nut 58 in which the threaded end 59 of pin 56 is screwed. It will be noted that bores 50,52 and their ends 51, 53 are all larger in width or diameter than the width or diameter of the pin and nut at all points. The purpose of this arrangement is described further below. The center portion 57 of pin 56 is slightly larger in diameter than adjacent portions 60, 62 which are disposed in bores 50, 52 respectively. The center portion 57 of the pin extends through a bore 64 formed in upwardly projecting head 66 of lower condylar section 30. The diameter of center portion 57 is slightly smaller than that of bore 64.

The lower condylar section 30 includes a bearing and hinge member 65 formed with two laterally extending portions 68 having upper cylindrically curved surfaces 70 defining bearing seats for the cylindrically curved surfaces 38 of roller bearing parts 34, 36.

A tapered shank or post 72 similar to post 42 is secured to the base of section 30 and depends therefrom. This shank is formed with longitudinally extending grooves 74 to receive bone growth and to help in anchoring the shank in a leg. The shank is adapted for securement by a surgical cement in the tibia of the leg where the joint assembly is installed.

When the joint assembly is installed and cemented in place in the thigh and calf of a leg, the surgeon will arrange muscles of the leg in front of the joint sections 25, 30 to effect flexing of the leg and thus serve as hinge means for the knee joint. Flexing will occur in a manner illustrated by FIG. 4. Pin 56 serves as a connector to prevent separation of the joint parts. The looseness of the pin in oversize bore 52 permits free flexing of the joint sections through an angle of as much as 150° when the leg is flexed. The leg will be weight bearing when a person is standing, walking or in the acts of sitting down or standing up. At such times there will be direct continuous contact between the joint sections 25,30. Pin 56 will not bear any weight. Surfaces 38 and 70 will then be in continuous sliding and rolling contact through the entire range of motion of the joint sections between the upright, extended unflexed position of FIG. 6 and the fully flexed or bent position. When the joint is fully opened and straightened, flat fact 75 of head 66 abuts the rear flat side 76 of member 32 between bearing parts 34, 36. When the joint assembly is not loaded as occurs during walking and while lying down a slight space S then exists between bearing surfaces 38 and 70 as shown in FIG. 4. The lower tibial section 30 then swings freely supported by muscles of the tibia. The natural flexibility in the muscles of the leg permits this slight relative, longitudinal, self positioning of the joint sections. The amount by which the bores are oversize with respect to the width of pin 56 and nut 58 at all points determines the relative longitudinal movement of sections 25, 30. It should be emphasized at this point, that pin 56 floats free. It is essentially unloaded and non-load bearing while the joint assembly itself is load bearing. The pin then serves only as an auxiliary retainer means to prevent separation of the joint sections. When the joint assembly is not loaded or weighted the pin floats free. The surfaces 38 and 70 may be but need not necessarily be in sliding contact with each other. It will be noted that in the fully extended position of the joint sections, face 75 of head 66 abuts flat side 76 of member 32. In fully rotated or flexed position of the joint sections as shown in FIG. 4, side 76 of member 32 contacts face 77 of head 66. By this arrangement substantially shockless plastic-to-metal contact of the parts occurs when the joint is fully open and closed. The metal parts of the joint assembly are preferably made of stainless steel but they can be made of other noncorrosive, strong, lightweight metal. The muscles tissues which restrain and control articulation of the joint sections are indicated by dotted lines in FIGS. 4 and 5.

Joint assembly J1 will in general be used for older persons or persons requiring a simple rotary motion at the knee. For younger persons having more resilient leg muscles and requiring a wider range of motion, joint assembly J2 shown in FIGS. 9–19 may be provided. Parts of joint assembly J2 corresponding to those of assembly J1 are identically numbered.

In joint assembly J2, bearing and joint member 65a of lower condylar section 30a is formed with a notch 80 in which a link 82 is pivotally engaged by retainer pin 56a. This pin has central, wider portion 57a engaged in oversized bore or hole 84 in the link. This hole is larger in diameter than that of pin portion 57; see FIGS. 16, 18. Pin portions 60a and 62a are engaged in bores 86, 88 formed in laterally spaced bearing portions 90, 92 of bearing member 65a. Bores 86, 88 are larger in diameter than pin portions 60a, 62a which they contain. Head 52a of pin 56a is seated in overside bore end 91. Flat nut 94 engages the threaded end 59a of the pin in bore end 93. Shank or post 72 is secured to and depends from bearing member 65a. Two adjacent curved faces 96 and 98 having different circumferential length but the same radius of curvature are formed on top of each bearing portion 90, 92.

Plastic bearing member 32a of upper joint section 25a rotates and rolls on bearing faces 96, 98 when the joint is weight bearing. Pin 56 serves to prevent separation of link 82 and bearing member 32a and does not serve as a weight bearing axle. The center pin section 57 is engaged in oversize hole 99 in link 82; see FIGS. 16 and 17. Pin portions 60 and 62 adjacent the center section 57 are engaged in oversize bores 50, 52 formed in the spaced, cylindrical rolling and sliding bearing parts 34a, 36a of bearing member 32a. Plate 40a carring upper shank 42 is secured to the top of bearing member 32a by pins 43 and screws 100.

By the structural arrangement described, bearing member 32a will normally be spaced slightly by space S' when the joint assembly is unloaded; see FIG. 13. This space is maintained by muscles and tissues of the leg. When the upper and lower joint sections rotate with respect to each other under load, cylindrical surfaces 38 of the plastic bearing member 32a will rotate and roll on concave faces 96 of larger circumferential length for about 90° while link 82 remains stationary; see FIG. 14. Then the upper joint section will rotate with link 82 into sliding engagement with concave bearing faces 98 and then the upper bearing member will continue to rotate further on faces 98 while link 82 again remains stationary. This condition obtains for flexing in the range of 90° to 150°; see FIG. 15. In upright position of the joint assembly link 82 contacts inner side 102 of notch 80 between bearing parts 34a and 36a. In the fully rotated position of the link, it contacts upper side 106 of notch 104. This metal-to-plastic construction insures substantially shockless contact of the joint sections on fully opening and closing. The muscles restraining and controlling articulation of the joint members are indicted by dotted lines in FIGS. 13 and 14.

In FIGS. 20–22 is shown another knee joint assembly J3 in which the relative rotational action of the joint sections closely approximates the condylar action occurring in a human knee. Parts of assembly J3 corresponding to joint assemblies J1 and J2 are identically numbered. In joint assembly J3, upper joint section 25b is provided with a plastic bearing member 32b having a notch 104' centrally formed therein between spaced lateral parts 34b and 36b of the bearing member. Link 82 in notch 104' is pivotally engaged by upper retainer pin 56 and is engaged in notch 80 of lower bearing member 65b by retainer pin 56a, as in joint J2. Both retainer pins are engaged in oversize bores in the bearing members and oversize holes in link 82 as in joint assembly J2. The faces 38' of lateral parts 34b and 36b progressively change and increase in radius of curvature from smaller radius R2 to larger radius R1. When the joint sections are in open upright position and under load, as shown in FIGS. 20, 21, faces 38' of bearing member 32b bear on the upper face 96' of bearing member 65b. Face 96' can be flat or curved. Link 82 then assumes a maximum angle of inclination and may contact inner side 80" of notch 80' and inner side 102' of notch 104'. This is a position of stability with joint fully open. Upper section 25b can turn counterclockwise as viewed in FIGS. 20 and 21 to the lowered, closed stable position shown in FIG. 22 when front side 120 of bearing member 32b rests on the upper face of bearing member 65b. As link 82 turns to the left, the distance it protrudes above face 96' at any point will always be such that faces 38' always remain in contact with face 96'. Since this distance changes and increases continuously, the radius of faces 38' increases progressively from radius R2 to radius R1. This cam-like action simulates very closely the condylar action occurring in the human knee. The muscles M which restrain and control the articulation of the joint sections are indicated by dotted lines in FIGS. 20–22.

It will be apparent from the foregoing that there has been provided a variety of prosthetic knee joint structures adapted to different patients' requirements. In all knee joint assemblies there are employed plastic-to-metal rolling and sliding contacts of bearing parts. In all knee joint assemblies the retainer pins in oversize bores serve only as retainer means to assist muscles and tissues of the leg in preventing separation of joint parts, and are not weight bearing axles. Weight bearing while the knee joint is straightened, flexed or flexing is accomplished by continuous plastic-to-metal contacts of the bearing parts. At other times clearance is maintained between the plastic and metal bearing parts by muscles and tissues of the leg.

While a limited number of embodiments of the invention have been described in detail it will be understood that this has been only by way of example. It will be apparent that many modifications and variations are possible without departing from the invention. Among the variations possible is construction of knee joint assemblies having both bearing members made of plastic, or both members made of metal, or either one of plastic and the other one of metal. It is also possible to adapt the knee joint assemblies for incorporation in artificial legs. Still other modifications, variations and applications of the invention may be possible without departing from the invention as claimed.

What is claimed is:

1. A prosthetic knee joint assembly, comprising mutually rollable and slidable upper and lower joint sections mountable to the thigh and calf respectively of a human leg, the upper joint section comprising a first weight bearing member having a lower first bearing portion, the lower joint section having an upper second bearing portion, both joint sections having attachment structure means adapted for securement of the joint sections to thigh and calf bones respectively of the leg, both bearing portions having mutually contacting, smooth, substantially frictionless surfaces so that the joint sections rollably and slidably contact each other when under the influence of body weight and while flexing; and transverse retainer means in both joint sections to prevent separation of the joint sections while permitting free relative motion thereof, said joint sections having transverse bores receiving said retainer means so that the latter floats free and is free of load when the bearing surfaces of the joint sections are in contact with each other under the influence of body weight.

2. A prosthetic knee joint assembly as defined in claim 1, wherein at least one of the bearing portions is composed of a plastic material having a smooth, slippery bearing surface to minimize friction between the bearing members when in sliding contact with each other, said plastic material having sufficient resiliency to prevent substantially occurrence of mechanical shocks and impact noises between the joint sections when the joint sections are fully opened and closed.

3. A prosthetic joint assembly as defined in claim 1, wherein the first bearing portion is composed of the plastic material which is resilient enough to absorb mechanical shocks so that the leg extends and flexes shocklessly at the contacting joint sections, the second bearing portion being composed of a rigid material so that the upper joint section rolls and slides silently, smoothly, freely and easily with respect to the lower joint section.

4. A prosthetic joint assembly as defined in claim 1, wherein said retainer means comprises a generally cylindrical retainer pin having different diameters at different points, said pin extending through the bores in both joint sections, said bores having diameters larger than the diameters of adjacent points of the pin at all points in the bores to provide free lateralplay between the joint sections, and to permit both flexure and extension of the joint sections.

5. A prosthetic knee joint assembly as defined in claim 4, wherein at least one of the bearing portions is composed of a plastic material having a smooth, slippery bearing surface to minimize friction between the bearing members when in sliding contact with each other, said plastic material having sufficient resiliency to prevent substantially occurrence of mechanical shocks and impact noises between the joint sections when the joint sections are fully opened and closed.

6. A prosthetic joint assembly as defined in claim 1, wherein said retainer means comprises a link and two generally cylindrical retainer pins having portions of different diameters, said link having spaced holes respectively aligned with the bore in the joint sections, said retainer pins respectively extending through the holes and bores in the link and joint sections, said holes and bores having diameters larger than the diameters of all adjacent portions of the retainer pins in the holes and bores to provide free lateral play of the pins between the joint sections and to permit flexure and extension of the joint sections.

7. A prosthetic knee joint assembly as defined in claim 6, wherein at least one of the bearing portions is composed of a plastic material having a smooth, slippery bearing surface to minimize friction between the bearing members when in sliding contact with each other, said plastic material having sufficient resiliency to prevent substantially occurrence of mechanical shocks and impact noises between the joint sections when the joint sections are fully opened and closed.

8. A prosthetic knee joint assembly as defined in claim 1, wherein the bearing portion of one bearing member is cylindrically curved at least in part so that the joint sections flex with an angular motion simulating human condylar knee action.

* * * * *